United States Patent
Diep et al.

[19]

[11] Patent Number: 6,041,121
[45] Date of Patent: Mar. 21, 2000

[54] HANDSET ACCESS MECHANISM AND METHOD

[75] Inventors: Vinh Hew Diep, Milpitas; Najibullah Naikal, Union City, both of Calif.

[73] Assignee: Harris Corporation, Melbourne, Fla.

[21] Appl. No.: 08/885,839

[22] Filed: Jun. 30, 1997

[51] Int. Cl.[7] .................................................. H04M 1/00
[52] U.S. Cl. ............................................ 379/446; 379/455
[58] Field of Search ................................. 379/446, 455, 379/454, 449, 426, 433

[56] References Cited

FOREIGN PATENT DOCUMENTS 61-161849  7/1986  Japan ....................................... 379/454
3-85949    4/1991  Japan ....................................... 379/433

*Primary Examiner*—Jack Chiang
*Attorney, Agent, or Firm*—Rogers & Killeen

[57] ABSTRACT

A secure, quick-release mount and method for easily accessing a telephone handset or other device which may be mounted in a difficult to access location such as within the close confines of an automobile compartment or on an elevated equipment shelf. The mount includes a pair of complementary slides for attachment to a telephone handset and a mounting bracket secured to a permanent location, and includes a latch and latching mechanism to assure that the handset remains securely stored and on hook when not in use, the latching mechanism being responsive to applied pressure to readily release the handset and to make it available when required.

18 Claims, 1 Drawing Sheet

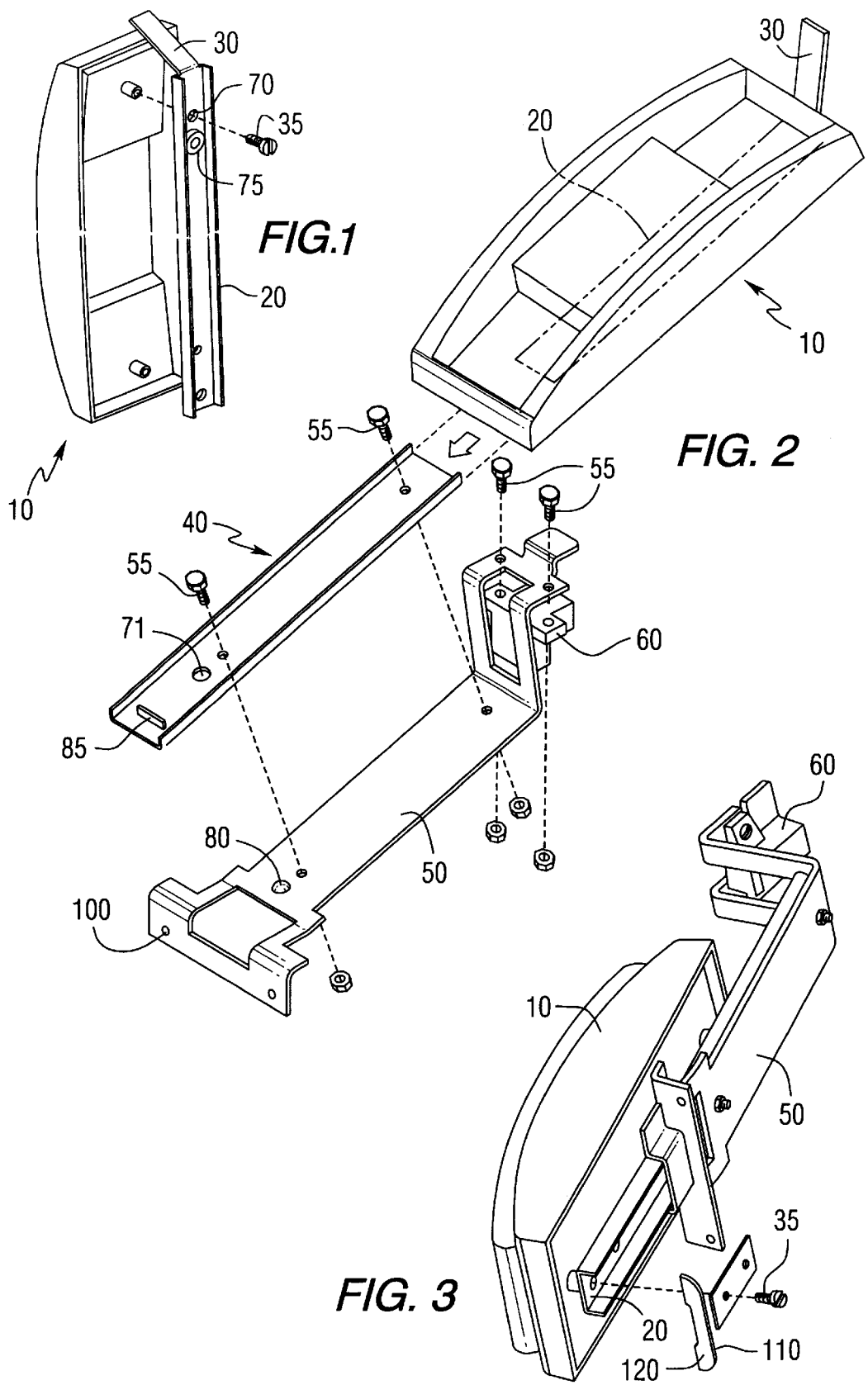

HANDSET ACCESS MECHANISM AND METHOD

BACKGROUND OF THE INVENTION

As the use of telephones and other devices becomes increasingly common in a variety of non-traditional and space-limited locations such as automobiles, in covered working locations, and as part of equipment cabinets, providing easy access while at the same time providing secure storage has become a problem evading an effective solution.

For example, in the prior art, automobile manufacturers have sought to integrate cellular telephones into automobiles by storing the telephone handsets within e.g., arm rests between seats. Access to such handsets is difficult and withdrawing the handset from its Storage compartment may present a safety hazard by requiring the automobile driver to divert her attention from the road to the handset.

Telephone handsets are often attached to other telephony equipment such as fax machines wherein the handset is placed hap-hazardously on the fax machine or on another surface. This arrangement often leads to the handset coming out of alignment with its base and unknowingly going off-hook so that the telephone line is no longer available to the fax machine and incoming faxes may be missed.

Similarly, handsets may be placed in difficult-to-reach areas or may be included as an integral part of a larger piece of equipment, such as an ATM machine, where the handset is relegated to a difficult-to-reach compartment.

The present invention obviates a number of these problems by providing a secure, quick-release mount and method for easily accessing a telephone handset or other device stored when not in use in such difficult to reach areas. The mount includes a pair of complementary slides, one of which may be attached to a telephone handset and the other to a mounting bracket secured to a permanent location. The slides and bracket include a latch and latching mechanism which, by holding the slides relative to each other, assure that the handset remains securely stored and in a retracted position, through a mechanical interlock, on-hook when not in use. By providing that the latching mechanism responds to an applied pressure, the mechanisms release the slides to freely move relative to each other and may automatically position the handset in a more convenient location to use.

Accordingly, it is an object of the present invention to provide a novel secure, quick-release mount for a telephone handset.

It is another object of the present invention to provide a novel telephone mount that, with the application of pressure, releases a telephone secured in a retracted position and positions the telephone in an extended position for easy access.

It is yet another object of the present invention to provide a novel method of securing a telephone handset in a restricted environment while assuring that the telephone remains on-hook.

It is still another object of the present invention to provide a novel method of securing a telephone handset when not in use, yet making the handset readily available in response to a push-pull action.

It is a further object of the present invention to provide a novel handset detachable from a slidable mount.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 1 illustrates a telephone base adjacent to a slide and latch.

FIG. 2 illustrates an embodiment of the present invention.

FIG. 3 illustrates a view of an embodiment of the present invention.

DESCRIPTION OF PREFERRED EMBODIMENTS

With reference to FIG. 1, telephone base 10 may be mounted on slide 20 having latch 30. Telephone base 10 may be mounted using any number of conventional means including screws 35. In another embodiment, a telephone handset may be mounted to slide 20. In yet other embodiments, a telephone base or handset may be manufactured with an integral slide 20.

FIG. 2 illustrates additional features of the present invention. Telephone base 10 mounted on slide 20 (shown in phantom) may be inserted into slide member 40. Slide member 40 may be secured to mounting bracket 50 with conventional means such as bolts and nuts 55. Mounting bracket 50 may be attached to a desired surface such as an elevated surface or within an equipment compartment. Telephone base 10 in connection with slide 20 may be moved bi-directional along the path described by slide member 40. Advantageously, as long as slide 20 remains inserted within slide member 40, base 10 will not move side-to-side. This assures that a handset resting in base 10 will not be disturbed and accordingly will remain on-hook.

Latching mechanism 60 is attached to mounting bracket 50 and positioned to operate co-operatively with latch 30. Latch 30 may desirably include a magnetic tab and latching mechanism 60 may be a spring-loaded magnetic latch. When slide 20 travels along slide member 40 so as to position latch 30 adjacent to latching mechanism 60, latch 30 mates with latching mechanism 60 and holds telephone base 10 and any inserted handset in a secured position. In one embodiment of the present invention, by applying pressure to a handset or to telephone base 10, pressure is applied to latch 30, causing latching mechanism to release latch 30 and allowing slide 40 to be pulled along slide member 40 away from latching mechanism 60 to the extended position.

In another embodiment of the present invention, slide 20 and slide member 40 operate in conjunction with various mechanisms, e.g., gears, to control the speed and balance of slide 20 relative to slide member 40. For example, spring tension within latching mechanism 60 may push slide 20, and attached base 10, away from latching mechanism 60 to the extended position.

Optionally, slide member 40 and mounting bracket 50 may be manufactured as a single component. Further, slide 20 and slide member 40 may include openings aligning with spring-loaded detent 80. Responsive to a user's push-pull action to release telephone base 10 from a secured position, base 10 is moved away from latching mechanism 60 by the relative movement of slide 20 along slide member 40. When opening 70 in slide 20 is aligned over opening 71 in slide member 40, spring-loaded detent moves into opening 70 in slide 20 and stops the movement of slide 20. This presents and latches the telephone in a ready position and may release the mechanical interlock which permits the telephone to go off-hook. If the invention is used in an embodiment having a handset resting in base 10, the user may conveniently remove the handset from base 10. If the invention is used in an embodiment wherein the handset does not include a separate base, a further pulling motion allows slide 20 to continue to move and to separate from slide member 40. In an alternative embodiment, a bumper/retainer arrangement may be used. Bumper 75 may be inserted into slide 20 so that as slide 20 moves relative to slide member 40, the forward motion of bumper 75 is limited by retainer 85.

One embodiment of the present invention includes a conventional interlock operatively connected to the upper slide for maintaining the telephone on-hook when the latch 30 and the latching mechanism 60 are engaged which maintains the telephone off hook as long as latch 30 and latching mechanism 60 are engaged. Thus the telephone can not be used when in the retracted position. Optionally, the present invention may include a conventional on-hook/off-hook indicator 100 to readily advise a user if the telephone is off hook.

With reference to FIG. 3, handle 110 may be mounted to slide 20 to facilitate withdrawing slide 20 from slide member 40. Handle 110 may include label surface 120 to provide instructions to an inexperienced user and/or a conventiional on-hook/off-hook indicator.

While preferred embodiments of the present invention have been described with respect to a telephone handset, it is to be understood that the embodiments described are illustrative only and the scope of the invention is beyond that of use with a telephone handset and is to be defined solely by the appended claims when accorded a full range of equivalence, many variations and modifications naturally occurring to those of skill in the art from a perusal hereof.

What is claimed is:

1. A latching access mechanism for a telephone comprising:

an upper slide for attachment to a telephone base;

a latch mounted on alternatively supporting said upper slide in either a first retracted position or in a second extended position;

lower slide for engaging and slidably supporting said upper slide;

a mounting bracket secured to said lower slide;

a latching mechanism attached on said mounting bracket, wherein said upper slide is engaged by and may slidably travel along said lower slide so that said latch may be mated with said latching mechanism in the retracted or extended position.

2. The access mechanism of claim 1, wherein said latching mechanism comprises a spring-loaded magnetic latch.

3. The access mechanism of claim 2, wherein said latch is a magnetic tab.

4. The access mechanism of claim 2, wherein said spring-loaded magnetic latch mechanism comprises spring means causing said upper slide to travel away from said latch mechanism.

5. The access mechanism of claim 1, further comprising a handle attached to said upper slide, for pulling said upper slide along said lower slide.

6. The access mechanist of claim 5, further comprising a label surface.

7. The access mechanism of claim 1, further comprising an on-hook/off-hook interlock operatively connected to said upper slide, for maintaining a telephone on-hook when said latch and latch mechanism are engaged in the retracted position.

8. The access mechanism of claim 7, further comprising an on-hook/off-hook indicator.

9. The access mechanism of claim 1, wherein said lower slide and mounting bracket comprise a single unit.

10. A method of securing a telephone handset comprising the steps of:

(a) providing a telephone handset;

(b) securing the handset to an upper slide having a latch;

(c) providing a lower slide which provides a sliding surface for said upper slide;

(d) mounting said lower slide onto a securing bracket;

(e) providing said securing bracket with a latch receiving means; and (f) inserting said upper slide into said lower slide until said latch is received by said latch receiving means so that said handset is secured in place.

11. The method of claim 10, wherein steps (c), (d), and (e) are accomplished by providing a mounting bracket with an integral lower slide.

12. The method of claim 10, wherein:

step (b) further comprises the step of providing a metal tab latch; and step (e) further comprises the step of providing a spring-loaded magnetic latch.

13. The method of claim 12, further comprising the step (g) of using a push-pull operation to release said handset from said secure position.

14. The method of claim 13, further comprising the step (h) subsequent to step (g) of pushing said handset mounted on said upper slide along said lower slide by spring action from said spring-loaded magnetic latch in order to position a released handset outward from said secure position.

15. The method of claim 10, wherein the steps of providing a telephone handset and securing the handset to an upper slide having a latch are accomplished by providing a handset with an integral upper slide.

16. A retractable mechanism for a telephone comprising:

a first mounting means adapted for attachment to a supporting structure;

a second mounting means slidably carried by said first mounting means between a retracted and an extended position and adapted for attachment to a telephone;

biasing means for biasing said second mounting means in said extended position;

latching means for latching said second mounting means in said retracted position, whereby the retractable mechanism is maintained in said extended position by said biasing means so that a telephone attached to the retractable mechanism is accessible for use and the retractable mechanism is slidably carried to said retracted position and maintained in said retracted position by said latching means so that a telephone attached to said retractable mechanism is stowed when not in use.

17. The retractable mechanism of claim 16, wherein said biasing means comprises a spring-loaded magnetic latch.

18. The retractable mechanism of claim 16, further comprising on-hook/off-hook interlocking means for maintaining the telephone on-hook when the telephone is in said retracted position.

\* \* \* \* \*